United States Patent [19]
Hamada et al.

[11] Patent Number: 5,144,288
[45] Date of Patent: Sep. 1, 1992

[54] COLOR LIQUID-CRYSTAL DISPLAY APPARATUS USING DELTA CONFIGURATION OF PICTURE ELEMENTS

[75] Inventors: Hiroshi Hamada; Toshiaki Takamatsu, both of Yamatokoriyama; Naofumi Kimura, Nara, all of Japan

[73] Assignee: Sharp Kabushiki Kaisha, Osaka, Japan

[21] Appl. No.: 506,542

[22] Filed: Apr. 5, 1990

Related U.S. Application Data

[63] Continuation of Ser. No. 722,591, Apr. 12, 1985, abandoned.

[30] Foreign Application Priority Data

Apr. 13, 1984 [JP] Japan .................................. 59-75301

[51] Int. Cl.$^5$ ............................................. G09G 3/36
[52] U.S. Cl. ..................................... 340/702; 340/784; 359/68; 358/61
[58] Field of Search ............... 340/702, 701, 703, 752, 340/783, 784; 350/339 F, 331 R, 334, 336; 358/56, 61

[56] References Cited

U.S. PATENT DOCUMENTS

| | | | |
|---|---|---|---|
| 3,840,695 | 10/1974 | Fischer | 358/61 |
| 3,873,870 | 3/1975 | Fukushima et al. | 340/703 |
| 4,326,776 | 4/1982 | Banda | 340/784 |
| 4,490,014 | 12/1984 | Levinson | 350/334 |
| 4,593,978 | 6/1986 | Mourey et al. | 350/339 F |
| 4,600,274 | 7/1986 | Morozumi | 350/339 F |

FOREIGN PATENT DOCUMENTS 2534052  4/1984  France ................. 340/701

*Primary Examiner*—Jeffery A. Brier

[57] ABSTRACT

The present invention relates to picture elements of a color liquid-crystal display apparatus, color arrangements of coloring means, and the electric control. The arrangement patterns of picture-element electrodes are provided which may be driven by a simple driving circuit and may obtain the regenerative images of high quality. In the color liquid-crystal display apparatus, the delta arrangement is adopted, thus improving the image resolution and the display quality.

13 Claims, 10 Drawing Sheets

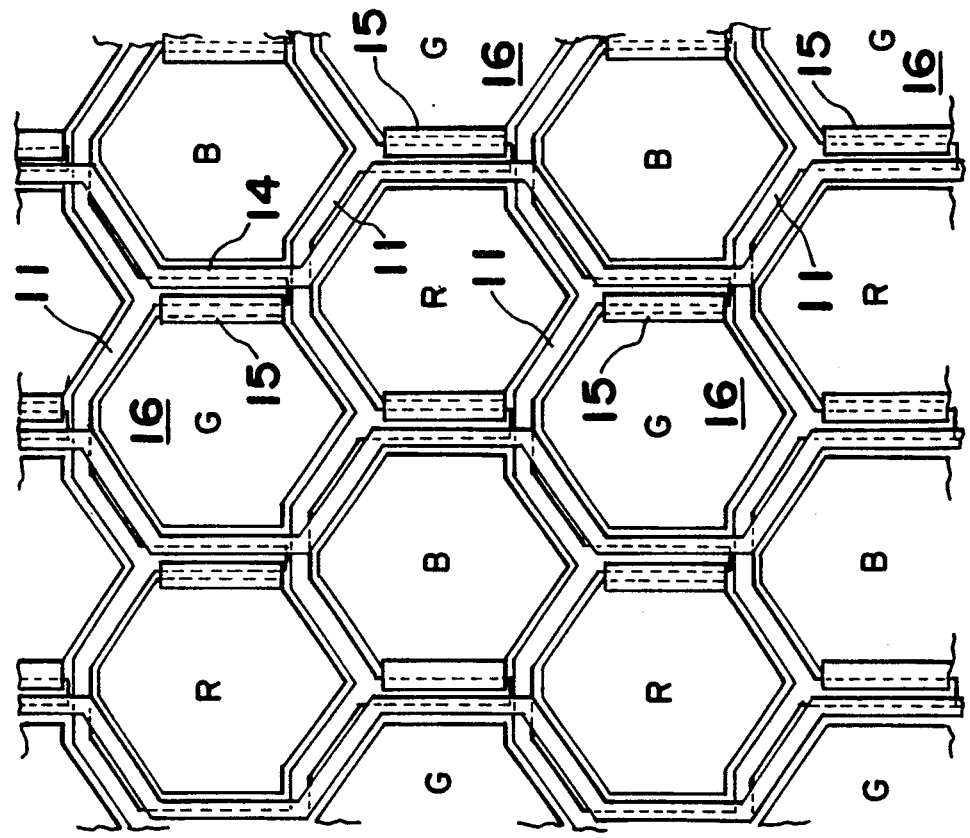
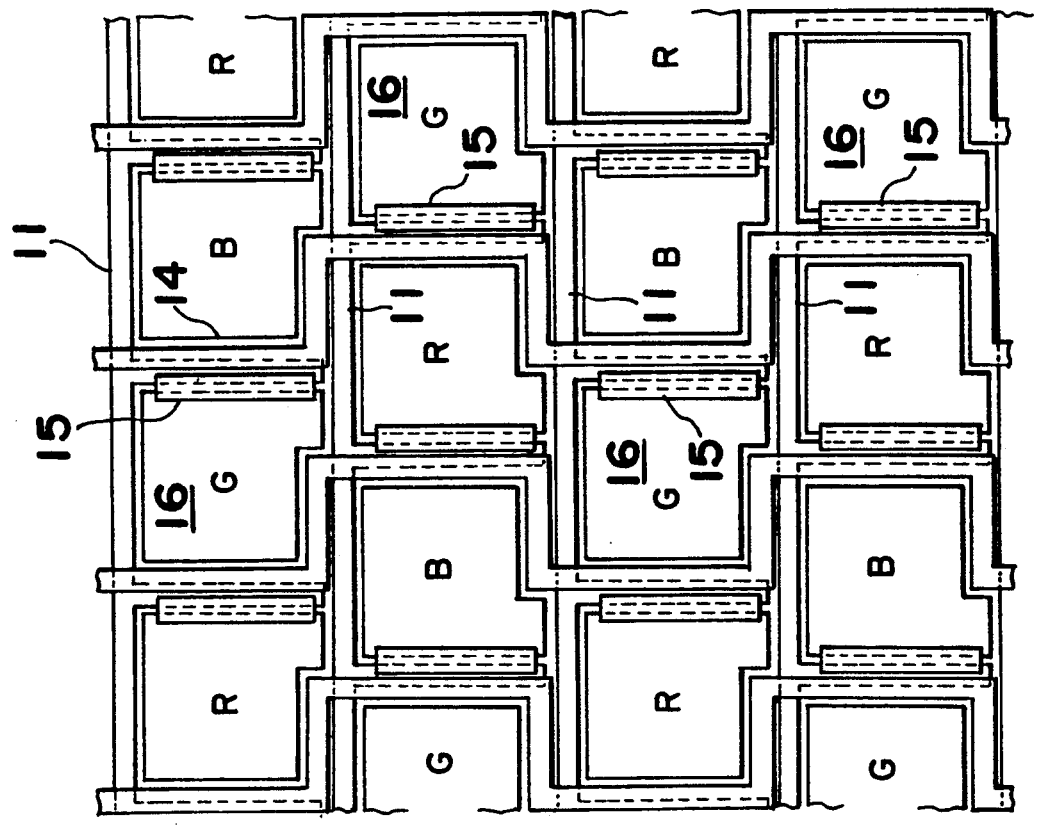

COLOR LIQUID-CRYSTAL DISPLAY APPARATUS USING DELTA CONFIGURATION OF PICTURE ELEMENTS

This application is a continuation of application Ser. No. 06/722,591 filed on Apr. 12, 1985, now abandoned.

BACKGROUND OF THE INVENTION

The present invention relates to picture elements of a color liquid-crystal display apparatus, color arrangements of coloring means, and electric control.

The color liquid-crystal display apparatus is provided with many picture elements arranged in dot-matrix shape and a coloring means arranged corresponding to each picture element. Each picture element is controlled through application of a picture signal corresponding to a color corresponding to each picture element so that colors are additively mixed in accordance with the same principle as that of a color CRT, with the result that an arbitrary color picture including a half tone color image may be displayed. Read "Liquid-Crystal Electronics Base And Application" (Ohm Company, 1979) or the like edited by Sasaki for details on the liquid crystal.

Many modes such as twisted-nematic (TN), guest-host (GH), dynamic-scattering-mode (DSM), phase transfer, etc. are available as an operation mode of a liquid crystal display apparatus. Particularly the TN and GH modes provide favorable results. In the guest-host, black die is used and is operated as a so-called black shutter.

Normally additive three primary colors are selected as the colors of the coloring means. An interference filter, a color filter made of inorganic or organic dye or pigment are used in the coloring means. The coloring means may be provided on the outer face of a substrate which constitutes a liquid crystal display apparatus or on the inner face thereof. In the case of the latter, the coloring means may be provided on or below a signal electrode, a scanning electrode, a picture element electrode or a common electrode.

In the color liquid crystal display apparatus, only the spectrum region of one color of three primary colors among the spectra of the incident light can be used and the remaining regions are absorbed by the coloring means. In the case of a liquid crystal operation mode using a polarizer, the light intensity to be used is further reduced by half so that it is very dark in a reflection type mode with no illuminating means in it. Thus, a light source such an incandescent lamp, fluorescent lamp, EL (Electro-luminescence) panel or the like is provided or a means for guiding ambient light to the rear face of the liquid crystal display apparatus are provided as the illuminating means. For application to a portable appliance, it is important to improve the radiation efficiency of the light source because of the severe restriction in power capacity. To faithfully reproduce picture signals, many picture elements, i.e., many scanning lines are required. For example, a liquid crystal panel for color television use will be considered. In the NTSC system of television broadcasting, the band width of the luminance signal (Y signal) is 4 MHz, while the band widths of I signal and Q signal which are color phase signals are respectively 1.5 MHz, 5.0 MHz As the sine waves of the 0.5 MHz includes 26.5 cycle waves in the 1 effective horizontal scanning period (53 microseconds), the horizontal resolution is equivalent to 53 lines or 26.5 line pairs of bright lines and dark lines. According to the theorem of Shannon, the loss of the information contained in the original signal cannot be caused if the sampling operation is performed with a frequency twice the highest frequency of the original signal. However, it is difficult to say that the images provided when the signals sampled in that manner have been reproduced as they are are visually faithful to the original signal under the influences of aliasing. As the result of our experiment visual satisfaction is provided when the sampling has been performed with a frequency higher than three times the highest frequency. Accordingly, to reproduce the color signal of 0.5 MHz, the information having the original signal can be reproduced almost faithfully if the number of the picture elements of the same color on the same horizontal line is 80 and more.

In a liquid crystal display apparatus provided with many picture elements, one of the following three methods is used to individually control the respective picture elements.

(1) SIMPLE MATRIX

As shown graphically in FIG. 7 (a), a stripe shaped electrode group is provided respectively on the two opposite substrates. They are sealed to each other so that they become normal to each other so as to constitute a liquid crystal display. Row selection signals are sequentially applied upon the row electrodes (scanning electrodes) SL, disposed on one substrate. An image signal is applied in synchronous relation with a row selection signal upon the column electrodes (signal electrodes) DL, disposed on the other substrate. The overlap regions (which are shown by oblique lines) between the row electrodes SL and the column electrodes DL become picture elements and the liquid crystal sandwiched between both the electrodes responds to the potential difference between them.

As the liquid crystal responses to the effective value in this method, the number of the scanning lines cannot be rendered large because of crosstalk and dynamic range.

To overcome such a restriction as described hereinabove, a multiple matrix is devised. This is a method of increasing the number of the picture elements in a scanning electrode direction instead of increasing the number of the scanning electrodes, by deformation of the signal electrode of the simple matrix. (Read "Liquid-Crystal Electronics Base And Application" (Ohm Company, 1979) edited by Sasaki).

Liquid crystal apparatus of duplex matrix and quadruplex matrix are now put on the market or being manufactured for trial. In the duplex matrix graphically shown in FIG. 7 (B), the number of scanning electrodes S1 is kept the same as before, the number of signal electrodes DL is doubled, the number of picture elements (which are shown by oblique lines) is also doubled, and each adjacent two rows of picture elements are simultaneously scanned.

As the shape of the signal electrode becomes complicated to produce the narrow wiring-width portion in the multiplex matrix, the wiring resistance is likely to become high. When the wiring resistance of transparent conductive film only cannot be made sufficiently low, metallic wirings are jointly used. When the metallic wirings are used, effective picture element area reduces to make the picture face dark. Also, once the multiplex degree increases, the area of the wiring portion becomes relatively large which reduces the effective picture-element area.

Also, the following two systems which are effective when the number of the picture elements is large have been developed.

(2) ADDITION OF NONLINEAR ELEMENT

There is a method of adding to each picture element a nonlinear element, such as varister, back-to-back diode, MIM (metal/insulator/metal) or the like, as an element to suppress the crosstalk. As shown graphically in FIG. 7 (C), picture element electrodes PE corresponding to the respective picture elements are provided and are connected respectively with the signal electrodes DL through the nonlinear elements NL. The scanning electrodes SL are disposed, on the opposite substrate, in a direction normal to the signal electrode DL. As shown in oblique lines, the picture element is located in the overlapped portion between the picture element electrode PE and the scanning electrode SL.

(3) ADDITION OF SWITCHING ELEMENT

This is a method of adding a switching transistor, as an active element, to each picture element to individually drive it. As shown graphically in FIG. 7 (D), a picture element electrode PE corresponding to each picture element is provided and is connected with a signal electrode DL through a switching element SW. Scanning electrodes SL are provided in a direction normal to the signal electrode DL and are connected with the gate of the switching element SW. On the other hand, a common electrode CE is provided on the opposite substrate. The picture element is provided on an overlapped portion between the picture electrode PE and the common electrode CE as shown in oblique lines. A storage capacitor is added when necessary. A driving voltage is applied and the capacitor is charged during a selection period, and the applied voltage is held by the capacitor even during a non-selection period. As the liquid crystal itself is also a capacitive load and its time constant of discharge is sufficiently larger than a repeated period of the driving, the storage capacitor can be omitted. A thin film transistor, a MOS-FET formed on silicon wafer or the like is used as a switching transistor.

Although not shown concretely in the above-description, a color filter is disposed corresponding to each picture element in a color liquid-crystal display apparatus.

The present invention is applicable to any one of the above-described system.

The color arrangement which is the subject of the present invention will be described hereinafter. A color liquid-crystal display apparatus using the liquid crystal is already disclosed in such as U.S. Pat. No. 3,840,695. An XY matrix display apparatus using three primary colors of stripe-shaped color-filter is known and a matrix display apparatus with a thin film transistor (TFT) being provided per each picture element electrode is disclosed in the abovementioned patent. In these examples, only the use of the three primary colors of stripe-shaped or mosaic-shaped color filter is described without any concrete mention of the three primary colors of arrangement method in the color arrangement. Also, in the conventional TFT matrix display substrate, the signal electrode and the scanning electrode which are connected with the column of the picture element and the row thereof were rectilinear, and all the picture-element electrodes were arranged on the same side of an intersecting point between the corresponding signal electrode and scanning electrode.

The conventional color arrangement (see FIG. 8) is largely divided into a stripe shape and a mosaic shape. In the stripe-shaped color arrangement, picture elements are arranged in parallel-like longitudinal stripes (FIG. 8 (A)) and lateral stripes (FIG. 8 (B)). In the mosaic-shaped color arrangement, square or rectangular picture elements are arranged in a checkered shape. Nine picture-element staircase shape (FIG. 8 (C)), longitudinal six picture-element type (FIG. 8 (D)), lateral six picture-element type (FIG. 8 (E)), four picture-element type (FIG. 8 (F)), and their modifications are taken into consideration. Referring to FIG. 8, reference characters R, G, B respectively show the red, green, and blue of additive three primary colors, and a parenthesis { shows a basic period the arrangement pattern of three colors (R, G, B). The six picture-element type and the four picture-element type have been proposed by the present inventors.

When the number of picture elements sufficient enough to faithfully reproduce the picture signals are provided, the color arrangement of the picture elements does not influence to the quality of the reproduced images. But when the number of picture elements is not sufficiently large, the quality of the reproduced images is adversely affected by the color arrangement. In the case of the stripe-shaped color arrangement, color switching of the driving signal is not necessary in the longitudinal stripe and all that must be done in the lateral stripe is to switch the color for each of the scanning lines before the analog line memory, but the spatial resolution in a direction normal to the stripe is inferior by as much as three picture element pitch thus causing Moire stripes easily. Also, in a condition where the white balance is filled, the brightness of the blue is so low in terms of the visibility characteristics that the blue looks extremely dark. Thus, blue lines look like black stripe patterns, thus spoiling the picture quality. On the other hand, in the case of mosaic-shaped color arrangement, in the nine picture-element staircase type, the same color of picture elements are obliquely connected in the staircase. The spatial resolution in a direction normal to its connection direction becomes $3/\sqrt{2}$ picture elements pitch, thus reducing the above-described disadvantage somewhat, but color switching of the picture signal is required for each of the signal electrodes and each of the scanning electrodes.

To improve such disadvantages as described hereinabove, the present inventors have proposed the color arrangement of the six picture-element type and four picture-element type. In the six picture-element type, the blue lines become zigzag, which makes the stripe patterns less conspicuous. In the four picture-element type, the green picture-elements are arranged in chequered patterns, and the spatial resolution becomes one picture-element pitch longitudinally and laterally, and becomes $\sqrt{2}$ picture-element pitch even in the worst oblique direction, thus resulting in considerably small anisotropy. As the blue pictures are arranged separately, no dark lines are produced. The visibility characteristics are such that the spatial resolution with respect to brilliance (brightness) is high, but the spatial resolution with respect to the color difference is not so high. In the contribution towards the brilliance, the green among the red, green, blue is largest. Accordingly, if the green picture element faithfully reproduces a brilliance signal (Y signal), the image quality is not deteriorated even if the space resolution is half as much as the green in the red and blue picture elements However, in the mosaic-shaped color arrangement, the resolution and the reproduced image quality are improved, but the driving circuit of the picture element is complicated. Namely, as described hereinabove, the colors of the picture element to be driven by the same signal electrode are two or three, thus requiring the color switching of the picture signal.

FIG. 9 (A), (B) are connection diagrams in a case where the liquid crystal is driven with a thin film transistor (TFT) of the conventional mosaic-shaped picture element arrangement. All the picture-element electrodes are arranged on the same side of an intersecting point between the corresponding signal electrode and the scanning electrode. Drain electrode of TFT 1 and the storage capacitors which are provided when necessary are connected with the picture element electrodes arranged in mosaic shape (not shown). In the drawing, the capacitors 2 are equivalent circuits showing the capacity of the liquid crystal and the point of each arrow is connected commonly to a common electrode. Each scanning electrode (gate line) 3 is connected with the gates of the TFT 1 arranged laterally. Also, each of the signal electrodes (data line) 4 is connected with the source electrodes of the TFT 1 arranged longitudinally. A gate driver 5 composed of a shift register sequentially scans the scanning electrodes 3 periodically with scanning pulses (horizontal synchronizing signal H) to turn on the TFT 1 connected with the selected scanning electrode 3. Picture signals applied upon the signal electrodes in synchronous relation to it are applied upon the picture-element electrodes (not shown) and the capacitors 2 through the TFT 1 whereby the liquid crystal is driven. The capacitors 2 maintains the voltage to be applied upon the liquid crystal during a time period with the TFT 1 off. When the time constant of the liquid crystal is sufficiently large as compared with the scanning period, the storage capacitor is not required to be provided in particular.

In the conventional mosaic-shaped color arrangement, picture elements of two colors or three colors are connected to the same signal electrode 4 to apply a signal (red, green, blue) corresponding to each color to a signal electrode 4. Each picture element selects only the corresponding signal through the periodic scanning operation of the scanning electrodes 3. As a result, a circuit which periodically switches the signals (red, green, blue) is required. In FIG. 9 (A). each picture signal of the Red, Green, Blue is respectively inputted into analog line memories so that the picture signal of each color sampled is inputted into a color switching circuit 7 provided for each of the signal electrodes 4, thereby selecting a signal corresponding to the color arrangement. Here, the analog line memory 6 samples a color picture-signal R, G or B to output a signal in synchronous relation to the scanning electrode. In FIG. 9 (B), before the picture signal is inputted to an analog line memory 6, each picture signal of the R, G, B is time-shared in accordance with the color arrangement by a color switching circuit 7, is converted into a serial signal and is sent into an analog line memory 6.

SUMMARY OF THE INVENTION

An object of the present invention is to provide arrangement patterns of picture-element electrodes which may be driven by a simple driving circuit and may obtain regenerative images of high quality.

The present inventors have found out that this object can be achieved by the adoption of delta arrangement.

The color liquid crystal display apparatus of the present invention is provided with picture elements corresponding to the intersecting points between the respective signal elements and scanning electrodes, and a coloring means of three colors, red, green, and blue disposed corresponding to each of the above-described picture elements are so arranged that rectilinear arrangements each having three colors of red, green, blue periodically arranged as one period may be rendered adjacent in parallel and shifted by half a period.

Each picture element which is composed of the above-described one line of rectilinear arrangement corresponding to the arrangement of the picture element is controlled by one scanning electrode and the same color of picture elements composing the adjacent two lines from among the lines of the same color of picture elements arranged in a direction vertical to the rectilinear arrangement are connected directly or through a non-linear element or a switching element to the same signal electrode. Each picture element constituting the above-described one line of rectilinear arrangement can alternatively be connected to the same signal electrode, and the same color of picture elements constituting the adjacent two lines among the lines of the same color of picture elements arranged at a 1.5 picture-element pitch in a direction vertical to this rectilinear arrangement are controlled by one scanning electrode.

Each one line or each two lines of the respective picture-elements constituting the above-described rectilinear arrangement can be controlled by the same scanning electrodes, and the same color of picture-element electrodes are connected every other line directly to the same signal electrode or through the non-linear element or a switching element.

BRIEF DESCRIPTION OF THE DRAWINGS

This object and other objects and features of the present invention will become apparent from the following description taken in conjunction with the preferred embodiment thereof with reference to the accompanying drawings, in which.

DETAILED DESCRIPTION OF THE INVENTION

Figure 1A:
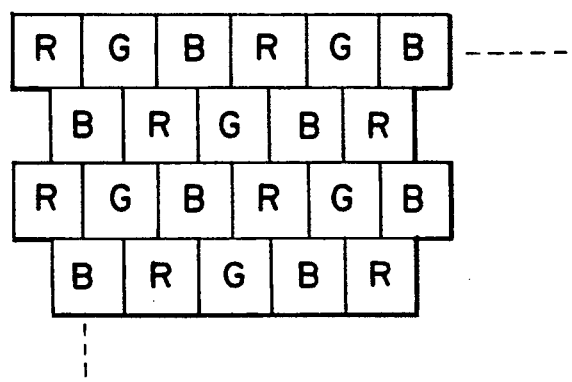
FIG. 1 (A), (B) are views each showing an example of the delta arrangement to be used in the present invention, FIG. 1 (C) is a view showing the relationship between the electrodes and the delta arrangement, FIG. 2 (A) is a plan view of TFT, FIG. 2 (B) is a cross-sectional view taken along a line A—A of FIG. 2 (A), FIGS. 3 (A) and 3 (B) are plan views of TFT.

Before the description of the present invention proceeds, it is to be noted that like parts are designated by like reference numerals throughout the accompanying drawings.

Figure 1B:
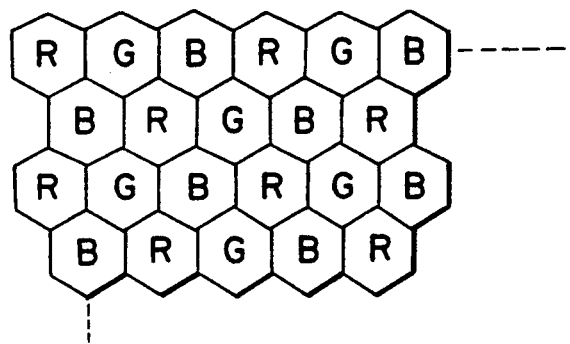
Figure 1C:
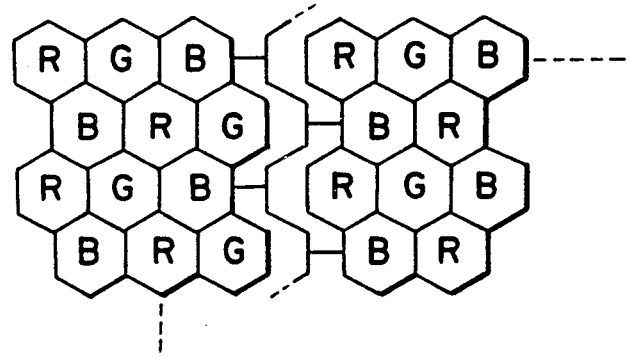

In the present invention, a delta arrangement is adopted as the color arrangement. It is known that the delta arrangement is least direction dependent with respect to spatial resolution. Namely, regenerative images of high quality can be realized through adoption of the delta arrangement. The color arrangement of the color filter and the arrangement of the picture elements corresponding to it are provided in delta arrangement. In the delta arrangement, three colors of red, green, and blue are periodically arranged rectilinearly and the adjacent rectilinear arrangements are shifted by half a period in a parallel direction to each other. In FIG. 1 (A) and FIG. 1 (B), the shape of the picture element is rectangular and hexagonal respectively. The gravity center of each color is arranged in an equilateral triangle. Assume that the ratio between the height of the triangle and the base thereof is $\sqrt{3/2}$ and the position of the gravity center of each picture element is in an equilateral triangle. The same color of picture elements are arranged symmetrically in six faces when the same color of picture elements only are taken into consideration. Also, the line of the same color of picture elements is arranged every other line in a direction vertical to the rectilinear arrangement and the line of the same color of picture elements in this vertical direction has a space of 1.5 pitch (half a period) in the lateral direction and is shifted by one picture-element portion in the longitudinal direction.

In the present embodiment, to simplify the driving circuit of the picture elements, the signal electrodes are caused to meander in a crank shape or a curve shape so that the amplitude may become one half of the picture element pitch as shown in FIG. 1 (C), and the picture elements (B in FIG. 1 (C)) to be driven by the same scanning electrode are arranged right and left alternately. Namely, the picture elements are arranged right and left alternately by 1.5 picture-element pitch (half a period) for each one line in the position of the gravity center of the picture element to be supplied with picture signals by the same signal electrode. Under such construction as described hereinabove, all that is necessary is to apply only the same color of picture signals to the same signal electrode. Thus, the color picture signals of the analog line memory are not required to be switched, with the result that the driving circuit becomes extremely simplified.

It is to be noted that the delta arrangement was initially adopted in the color CRT art field. It followed as a logical consequence, because an electron gun of caliber as large as possible was required to be arranged in a narrow neck. The present invention was adopted in response to the other art demand. It is rare to be used in the color TV for home use, because a highly efficient electron gun is available.

Figure 2A:
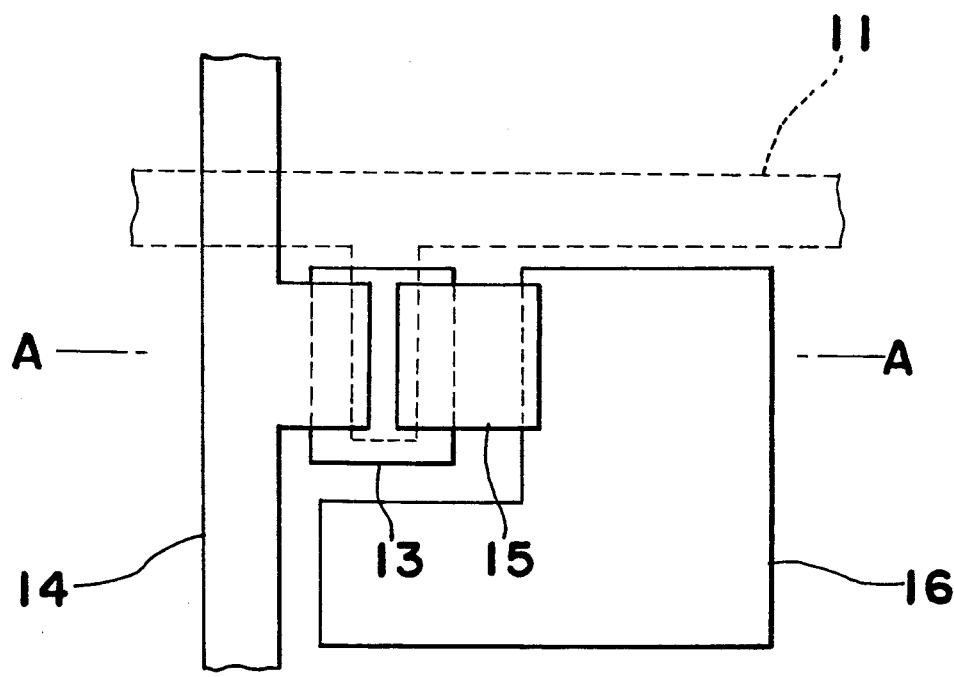
Figure 2B:
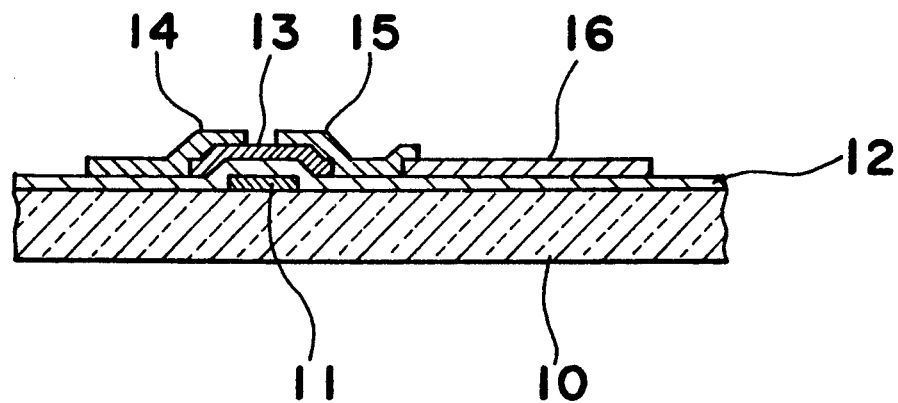

A color liquid crystal display apparatus with switching elements added thereto will be described hereinafter in an embodiment. FIG. 2 (A) is a plan view showing one example of a thin film transistor (TFT), which is a switching element. FIG. 2 (B) is a cross-sectional view taken along a line A—A of FIG. 2 (A). The TFT has a scanning electrode 11, a gate insulating film 12, a semiconductor film 13, a signal electrode 14 and a drain electrode 15 sequentially patterned and laminated on a transparent insulating substrate 10 of glass or the like. A picture-element electrode 16 and a storage capacitor (not shown) which is provided at need are connected with the drain electrode 15. A vacuum evaporating method, a sputtering method, a CVD method, a plasma CVD method, a low pressure CVD method or the like is used as a thin film forming method, and the patterning is performed by the art of shadow mask or photo-lithography. To drive the liquid crystal by a substrate with this TFT being formed thereon, optical shield and orientation layer are further provided. If a positive voltage is applied upon the scanning electrode 11 when an n type semiconductor has been used as a semiconductor film 13, an accumulation layer of electrons is formed on the surface on the side of the gate insulating film 12 of the semiconductor film 13 to modulate the resistance between the signal electrode (source electrode) 14 and the drain electrode 15.

One of the characteristics of the present invention is to cause the signal electrode to meander right and left and the picture elements, which are driven by the same signal electrode, to be synchronized with the meandering to put them right and left alternately to shift the picture-element arrangement by 1.5 picture-element pitch for each of the scanning lines so as to realize the delta arrangement. The color of the picture elements to be driven by the same signal electrode under such construction as described hereinabove becomes the same, thus rendering the color switching unnecessary. One example of the connection patterns is shown in FIGS. 3 (A) and 3 (B). FIG. 3 (A) shows an example wherein the shape of the picture elements is rectangular and FIG. 3 (B) shows an example of a hexagonal shape. It is to be noted that for simplication, the semiconductor film 13 and the insulating film 12 of the cross portion between the signal electrode 14 and the scanning electrode 11 are omitted.

The aim of the present invention is that the position of the gravity center of each picture element is delta shaped and the shape of the picture element is not restricted to the rectangle and hexagon. Also, the patterns shown in FIG. 3 (A), (B) show one example of the patterns in a case where the scanning electrodes only are branched to constitute the transistor. Both the signal electrodes and the scanning electrodes can also be branched to constitute a transistor. Also, the example shows a case where the scanning electrode is provided first, the signal electrode and the drain electrode is provided later, but they may be provided in the opposite order.

In the present invention, the same color of picture elements are driven by the same signal electrode, but the images to be regenerated are shifted by 1.5 picture element right and left for each of the scanning electrodes, with the sampling timing of the analog line memory being fixed in the delta arrangement of the picture elements, thus lowering the resolution. This inconvenience is avoided through shifting of the sampling timing by a time equivalent to 1.5 P (P=effective horizontal scanning time/number of horizontal picture elements) with odd lines and even lines. To shift the timing of the sampling, only a signal for driving the odd or even signal electrode in accordance with the odd or even selected scanning electrode is required to be delayed by 1.5 P.

Figure 4:
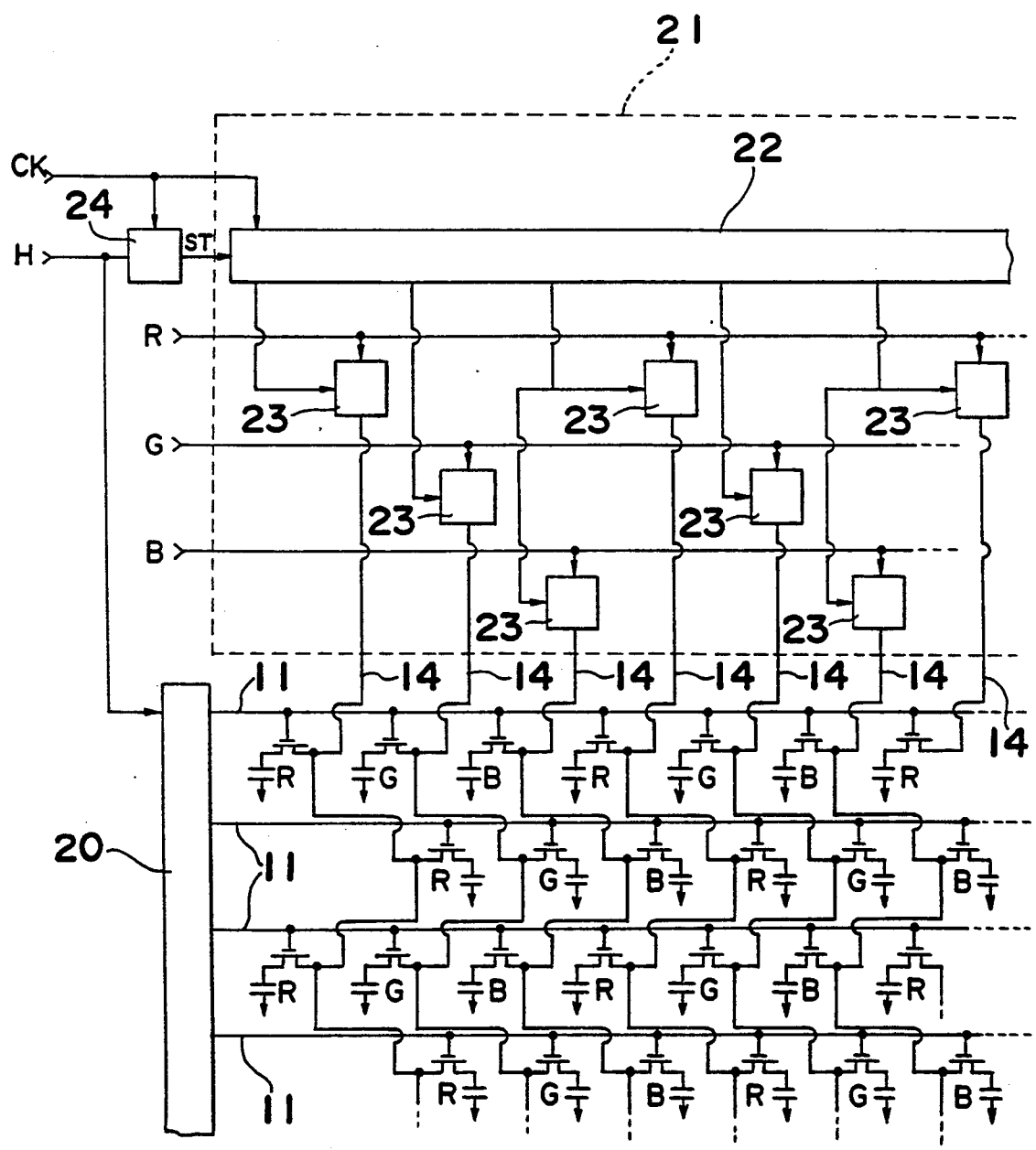
FIG. 4 is a driving circuit diagram of picture-element electrodes of the color arrangement in the embodiment of a color liquid-crystal display apparatus with TFT added thereto, FIG. 5 (A) and 5 (B) are views each showing graphically the embodiment of the present invention with respect to simple matrix and double matrix, FIGS. 6 (A), 6 (B), 6 (C) are views respectively graphically showing embodiments of simple matrix, double matrix, and double matrix with non-linear elements added thereto, FIGS. 7 (A), 7 (B), 7 (C), and 7(D) are views graphically showing a system of displaying various matrixes, wherein (A) shows simple matrix, (B) double matrix, (C) double matrix with non-linear elements added thereto, and (D) double matrix with switching elements added thereto, FIGS. 8 (A), 8 (B), 8 (D), 8 (E), and 8 (F) are views showing the conventional color arrangements, wherein (A) shows a longitudinal stripe type, (B) a lateral stripe type, (C) a nine picture-element staircase type, (D) a longitudinal six picture-element type, (E) a lateral six picture-element type, and (F) a four picture-element type, and FIGS. 9 (A) and 9 (B) are respectively connection diagrams in the case where the liquid crystal is driven by the thin film transistor (TFT) panel of the conventional mosaic-shaped picture-element arrangement.

FIG. 4 shows an example of a driving circuit of a liquid crystal display panel of the present invention. A gate driver 20 composed of a shift register scans the scanning electrodes 11 sequentially by a horizontal synchronizing signal H to turn on the transistors 2 connected with the selected scanning electrode 11. The time width of the gate pulse is not always necessary to be 1 H (horizontal scanning time) and pulses to be applied upon each scanning electrode may be overlapped. To make the width of the gate pulse larger than 1 H is the subject of another invention by the present inventors. The aim of that invention is to turn on the scanning electrode 11 prior to the original timing to preliminarily charge the liquid crystal and the storage capacitor. For use in the embodiment, the same color of picture signals are normally applied upon the same signal electrode 14 and the correlation of the signals between the adjacent scanning lines is high in the normal picture signal so that the effect of the preliminary charging is large to render the crosstalk between the colors negligible.

An analog line memory 21 for driving the signal electrode is composed of a shift register 22 and sample hold circuits 23. The shift register 22 sequentially transfers start pulses ST by a clock pulse CK of a period $\frac{1}{2}$ P to generate sampling pulses. The sample hold circuits 23 receive the sampling pulses to sample the color picture signals R, G, B to drive the signal electrodes 14 in synchronous relation to the gate signal H. The picture elements to be driven by the same signal electrode 14 are the same in color in the arrangement of the picture elements so that the color switching operation of the picture signals to be inputted to the sample hold circuits 23 is not required.

A start pulse delay circuit 24 shifts the sampling timing of the odd scanning lines and the even scanning lines. In an example of FIG. 4, the sampling timing is delayed by 3 clock pulses, which are 1.5 P when the scanning electrode is in an even number. In such a sampling method, a period = $\frac{1}{2}$ P clock pulse is required, but substitution can be made by the clock pulse of a period of 1 P or 1.5 P when the short clock period is to be avoided.

In the former, the positional shift of the $\frac{1}{2}$ picture element is caused between the odd line and the even line. In the latter, the picture signals of the G may be sampled at the original timing and the R and B may be simultaneously sampled at a timing corresponding to a central position where they are connected with each other. In this manner, the picture quality is hardly deteriorated because of the following reason. Visibility is high in the spatial resolution with respect to the brilliance (brightness), but is not so high in the spatial resolution with respect to the color difference. As the contribution towards the brilliance is largest in G among the R, G, B, visibility is hardly influenced even if the positional shift of $\frac{1}{2}$ picture element in the R and B is present when the G is faithfully reproduced.

Then, a substrate on a common electrode side with transparent conductive film and color filter provided on the transparent substrate of glass or the like is made by a known method although not shown. Interference filter, organic or inorganic dye or pigment are used as the color filter. In the color filter, three primary colors are arranged in delta to suit the delta arrangement of the above-described picture element electrodes by a photolithography or a printing method. Transparent conductive film composed of ITO is provided thereon by a method of ion plating or the like. An orientation layer for orientating the liquid crystal is provided thereon.

A substrate with picture-element electrodes disposed in delta arrangement and a substrate with common electrodes disposed thereon are sealed to each other through a spacer, and liquid crystal is impregnated into the gap between the substrate to complete the color liquid crystal panel. When an operation mode of the liquid crystal is TN, a polarizer is provided on both faces of the liquid crystal panel.

When images have been reproduced by the color liquid-crystal display panel coupled in this manner, the resolution and display quality have been proved to be better, and the Moire stripes have been un-noticeable.

The above description applies to a case where the picture elements which cause the signal electrodes to meander and drive them by the same signal electrode are arranged right and left alternately. Needless to say, a similar effect is caused even when the picture elements are arranged with the scanning electrodes being meandered and the same scanning electrodes being provided up and down alternately. It is necessary to retain a picture signal located on a scanning line but one scanning line or two may be scanned by a delay element such as surface acoustic-wave (SAW) element or the like or an analog line memory.

The present invention is also applicable to a liquid crystal display apparatus (simple matrix system, adding system with nonlinear elements thereon, or the like) with switching elements added thereto.

Figure 5A:
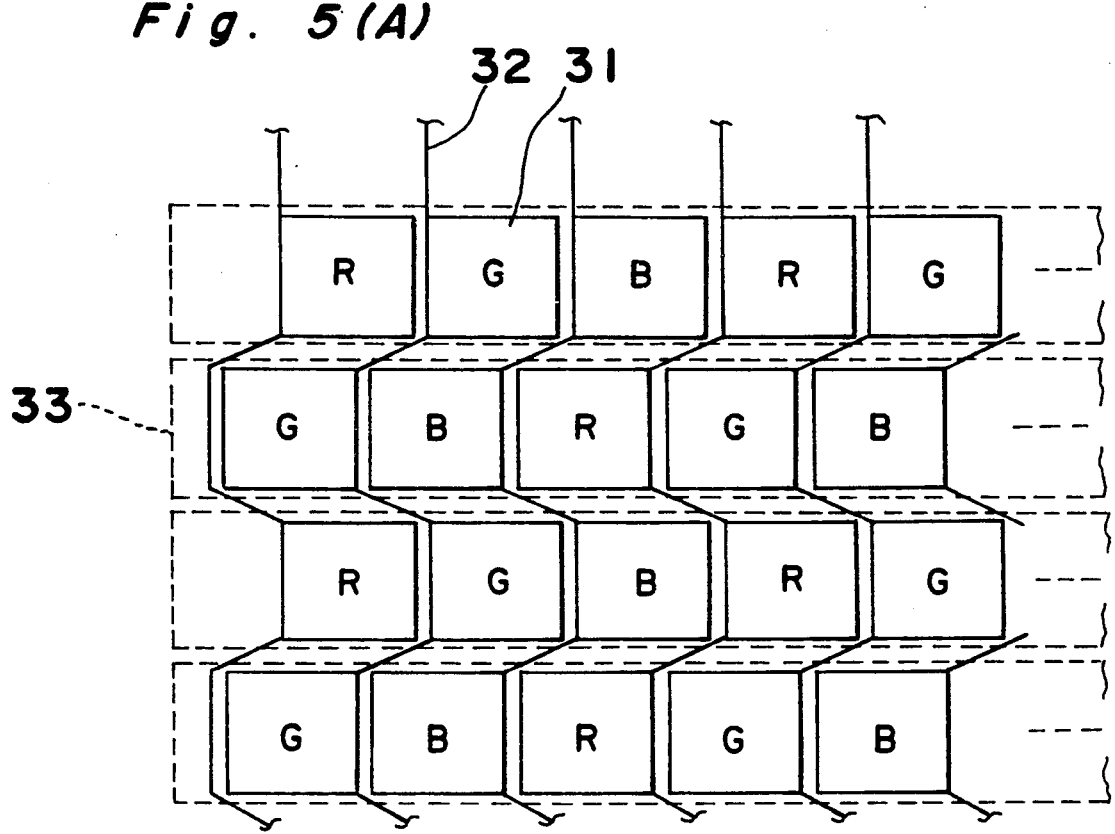
Figure 5B:
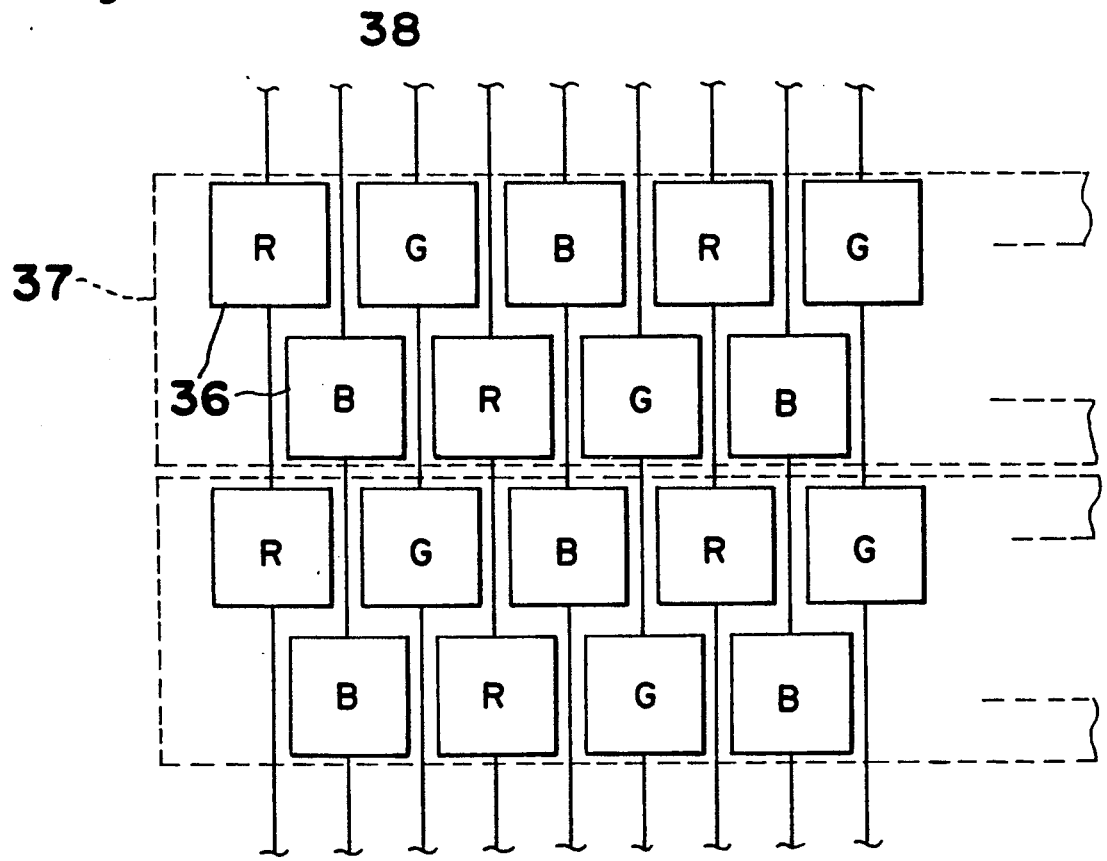

FIG. 5 (A) is a view graphically showing the embodiment of the present invention with respect to the simple matrix. The picture-element electrodes 31 of the delta arrangement are directly connected to the signal electrodes 32. Each of the signal electrodes 32 is caused to meander so that the amplitude may become $\frac{1}{2}$ of the picture-element pitch, and is directly connected with the same color of picture elements 31 which are arranged right and left alternately by 1.5 picture element pitch (half a period). The scanning electrodes 33 are provided corresponding to the lateral arrangements of the picture-element electrodes 31 in parallel laterally to the opposite substrate.

FIG. 5 (B) is a view graphically showing the embodiment of the present invention with respect to the double matrix. The scanning electrodes 37 provided in parallel on the opposite substrate with respect to the picture-element electrodes 36 of the delta arrangement are arranged to correspond to two lines in the lateral direction of the arrangements of the picture elements. In the connection between each signal electrode 38 and the picture-element electrodes 36, one signal electrode 38 is connected only to the same color of picture-element electrodes existing every other line in the longitudinal direction, which is different from the above embodiment.

Figure 6A:
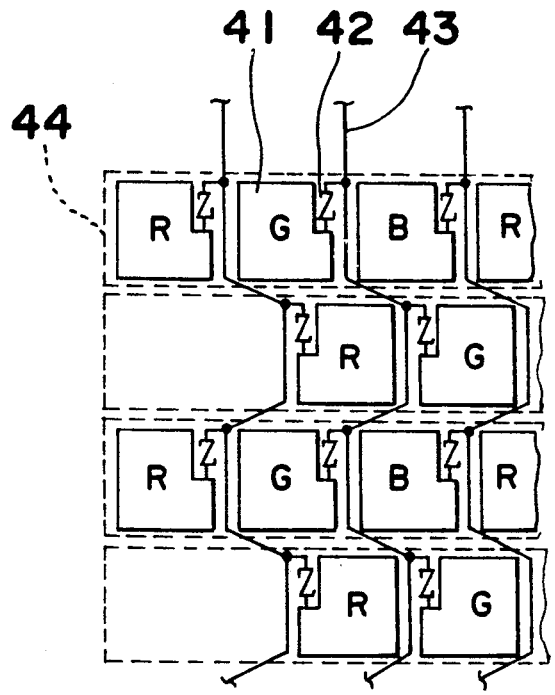
Figure 6B:
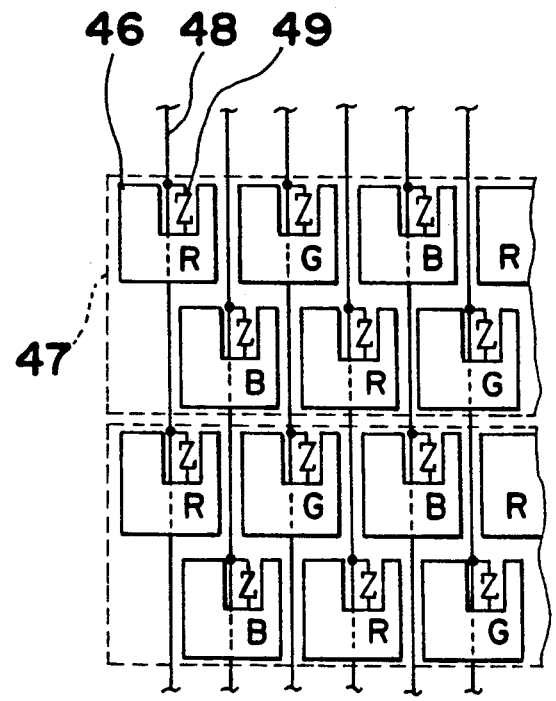
Figure 6C:
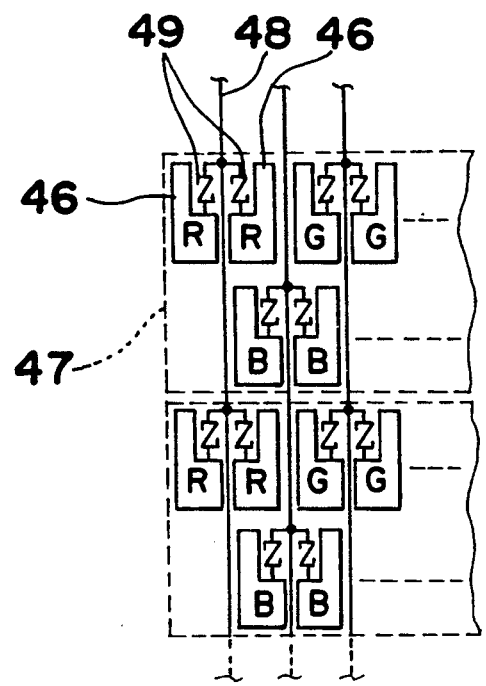
Figure 7A:
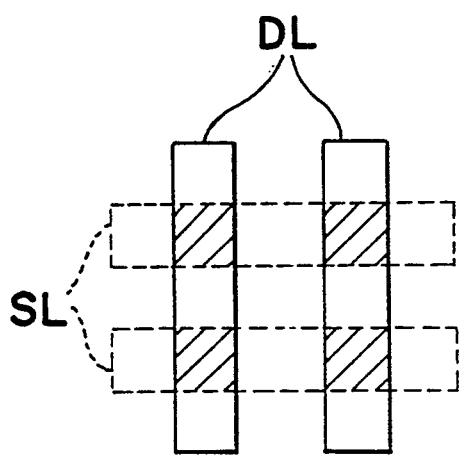
Figure 7B:
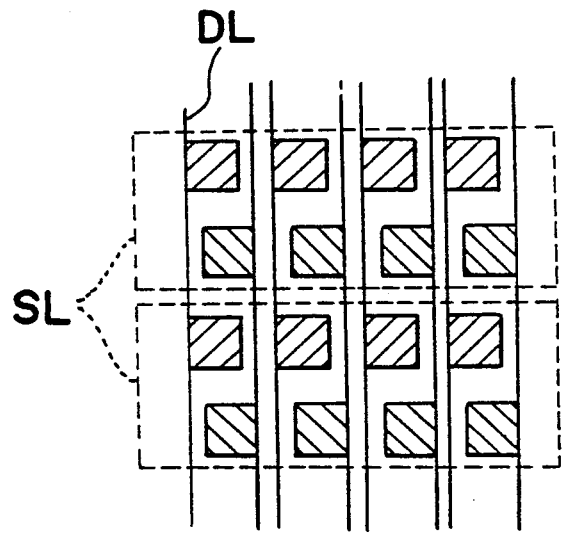
Figure 7C:
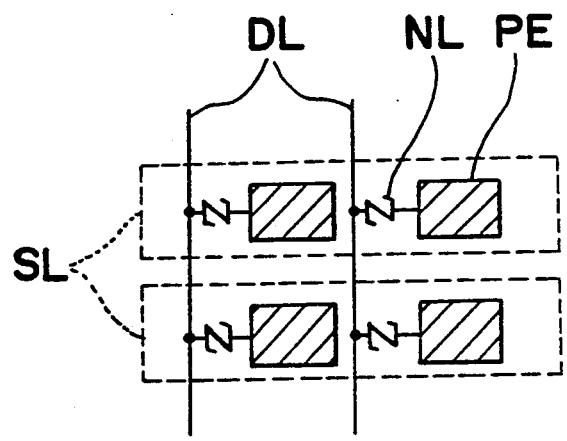
Figure 7D:
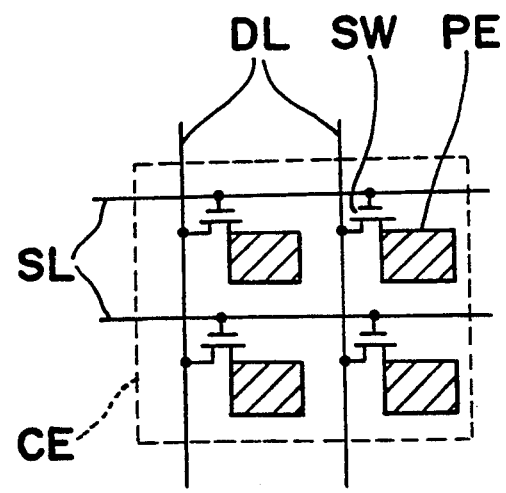
Figure 8A:
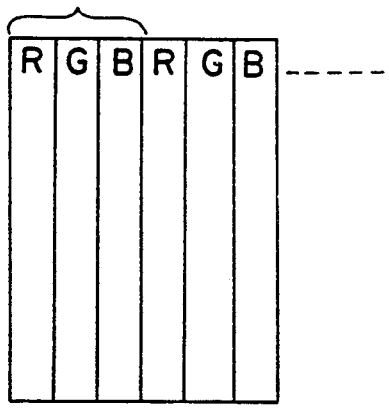
Figure 8B:
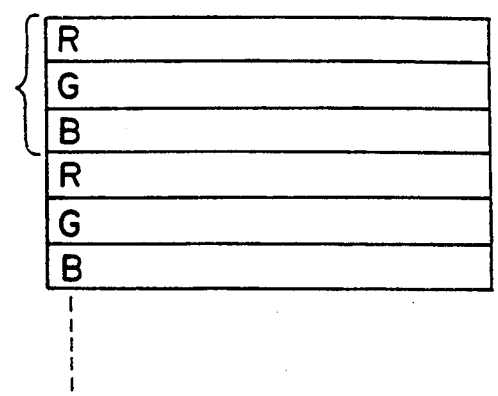
Figure 8C:
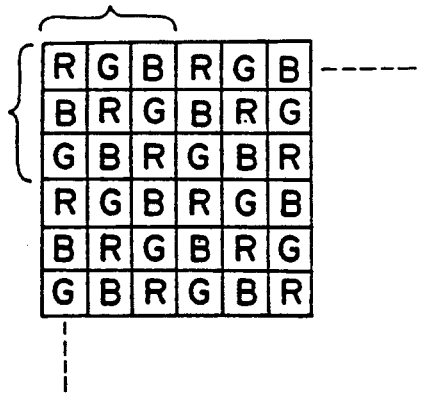
Figure 8D:
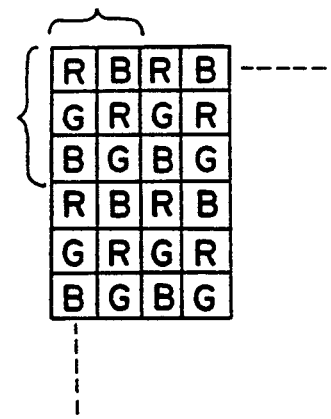
Figure 8E:
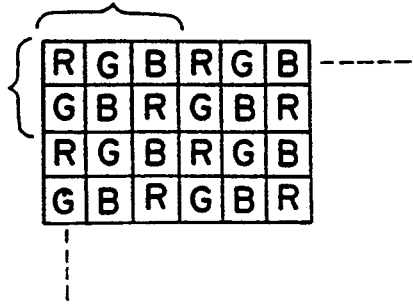
Figure 8F:
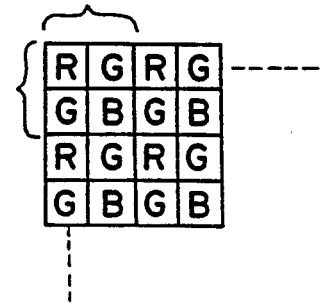
Figure 9:
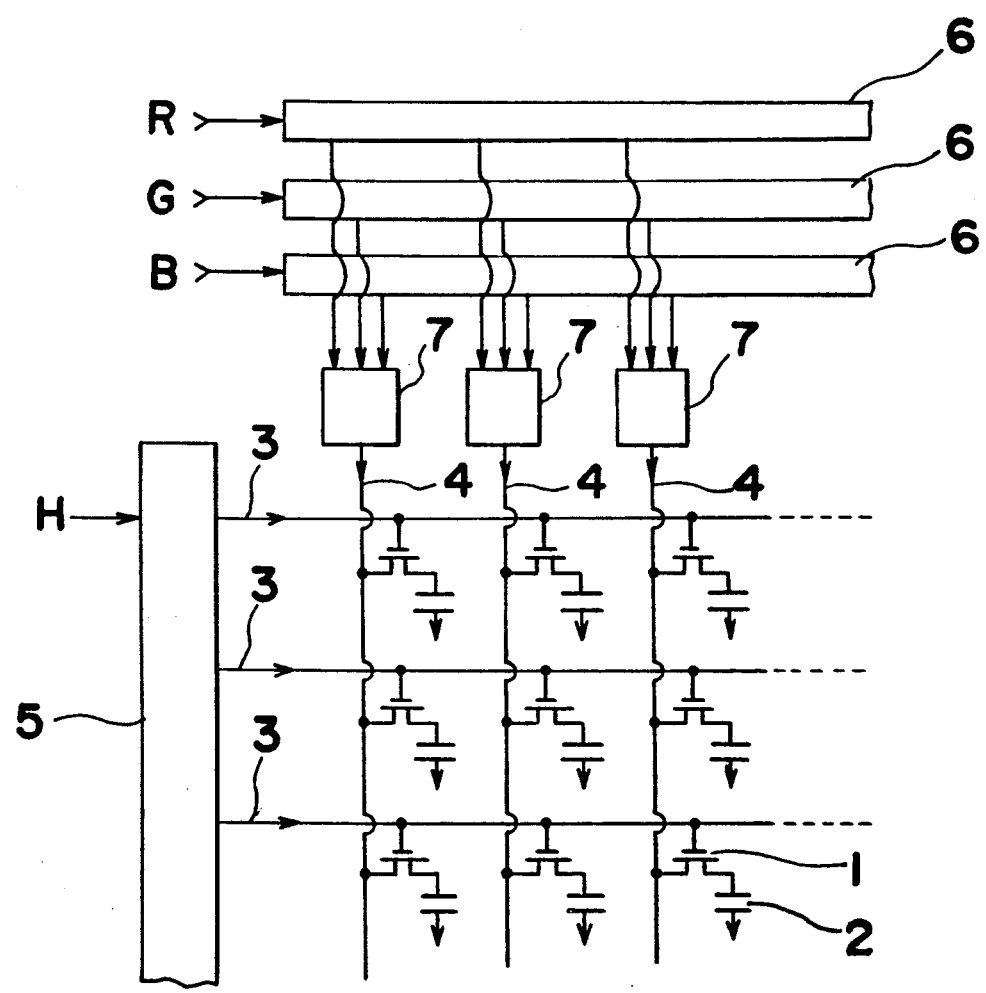
Figure 9B:
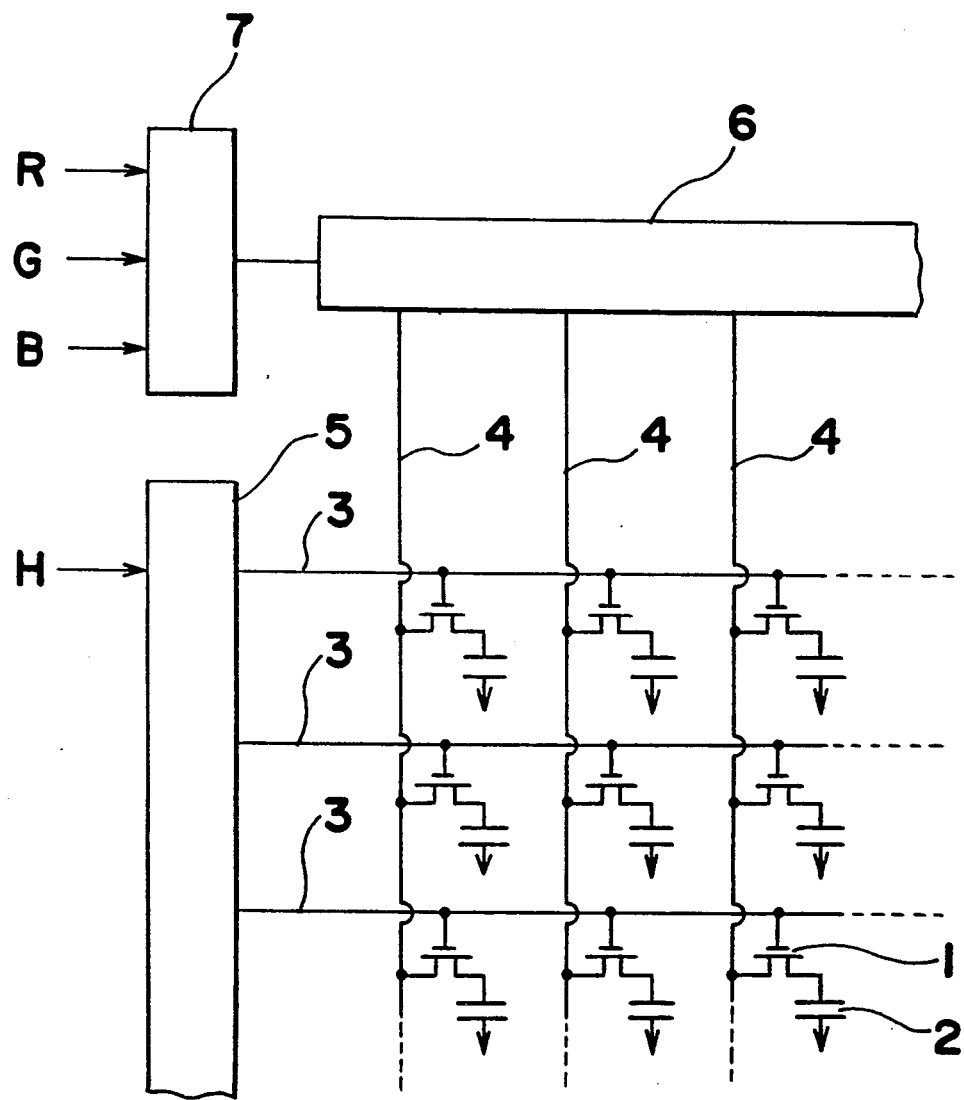

FIGS. 6 (A), (B), and (C) show embodiments of a color liquid crystal display apparatus with nonlinear elements being added thereto.

In FIG. 6 (A), the picture-element electrodes 41 of the delta arrangement are respectively connected with the signal electrodes 43 through the nonlinear elements 42. Each of the signal electrodes 43 is caused to meander so that the amplitude may become ½ of the picture-element pitch, and is connected to the same color of picture-element electrodes 41 arranged right and left alternately by 1.5 picture-element pitch (half a period) for each one line. The scanning electrodes 44 are provided corresponding to the lateral arrangement of the picture-element electrodes 41 in parallel laterally on the substrate.

FIG. 6 (B) is a view graphically showing an example of a color liquid-crystal display apparatus with nonlinear elements added thereto with respect to the double matrix. The scanning electrodes 47 provided on the opposite substrate are arranged so that one may correspond to two lines of the lateral direction of the arrangements of the picture elements with respect to the picture-element electrodes 46 in delta arrangement. Each of the signal electrodes 48 grade separation of the picture-element electrodes 46 through insulating film not shown. In the connection between each signal electrode 48 and the picture-element electrodes 46, one signal electrode 48 is connected through nonlinear elements 49 only to the same color of picture-element electrodes 46 existing every other line in the longitudinal direction as in the embodiment shown in FIG. 5 (B).

FIG. 6 (C) is the modification of an example shown in FIG. 6 (B). Each picture-element electrode is divided into two portions 46', arranged on both sides of a signal electrode 48 and respectively connected with the same signal electrode 48 through the nonlinear elements 49. In this case, the signal electrodes 48 are not required to grade separation of the picture-element electrodes 46'.

Even in a color liquid crystal display apparatus with switching elements added thereto, the picture elements and each electrode can be arranged in accordance with the same aim shown in FIG. 6 (B), (C).

Normally the picture elements are driven by a voltage averaging method (see the book described before) in a simple matrix system and an adding system with nonlinear elements added thereto. To produce a half tone, the width of the selection pulse width to be applied upon a signal electrode is modulated in accordance with gradation (see Television Society Journal 31, 940 (in 1977)). To apply the present invention to this case, a pulse width modulation circuit is provided between a signal electrode 14 and a sample hold circuit 23 of an analog line memory 21 of FIG. 4. This circuit is adapted to modulate the width of the selection pulse to be applied upon the signal electrode in accordance with a picture signal sample-held by a sample hold circuit 23.

Also, a digital line memory, instead of an analog line memory 21, may be used. In this case, the picture signals are converted into a digital signal by an A/D converter and sequentially store in the digital line memory. Then, the width of the selection pulse to be applied upon the signal electrode is controlled by a digital picture signal stored in the digital line memory. In this case, a method is used of generating a series of pulses each being different in the pulse width in accordance with the number of the bits of the A/D conversion and selecting by a multiplexer a pulse of the pulse width corresponding to the level of the picture signal.

Even when the analog line memory or the digital line memory is used, the color switching is required in the conventional construction, but in the present invention, the color switching becomes unnecessary as in a case where the switching element has been added.

As is clear from the foregoing description, according to the present invention, in the color liquid-crystal display apparatus, the delta arrangement is adopted, thus improving the image resolution and the display quality.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A color liquid crystal display apparatus, comprising:
   a plurality of picture element groups arranged in a matrix, each picture element group including,
      a plurality of color picture elements, each color picture element associated with a particular color corresponding to red, green, or blue,
   said plurality of color picture elements being arranged in a delta configuration;
   a plurality of scanning electrodes arranged in parallel and extending over said matrix in a first direction; and
   a plurality of signal electrodes arranged in parallel and extending over said matrix in a second direction perpendicular to said first direction;
   said picture element groups being arranged parallel to said scanning electrodes and in such a manner that said color picture elements are disposed in a plurality of lines along said first direction, color picture elements of the same color in any two adjacent lines being arranged at a 1.5 element pitch in said first direction, color picture elements of the same color in any two alternate lines being arranged in parallel along said second direction,
   each said signal electrode being of a zigzag configuration and being connected only to color picture elements of the same color on alternating sides of said signal electrode in alternating ones of the plurality of lines, respectively, so as to drive only color picture elements of the same color through each signal electrode,
   said scanning electrodes being connected to at least two color picture elements of picture element groups parallel thereto.

2. The color liquid crystal display apparatus claimed in claim 1, wherein said scanning electrodes are connected to all the color picture elements of each picture element group parallel thereto.

3. The color liquid crystal display apparatus claimed in claim 1, wherein said signal electrodes are connected to said color picture elements through non-linear elements.

4. The color liquid crystal display apparatus claimed in claim 1, wherein said signal electrodes are connected to said color picture elements through switching elements.

5. The color liquid crystal display apparatus claimed in claim 1, wherein the picture electrodes of three different color picture elements are arranged in a delta configuration, the adjacent signal electrodes are each connected with the picture elements of the same color, and each said scanning electrode is connected to color picture elements of three colors, forming a set of R, G, B.

6. A method of arranging a plurality of color picture elements of a color liquid crystal display device including a plurality of parallel scanning electrodes arranged in a first direction and a plurality of parallel signal electrodes arranged in a second direction, perpendicular to the first direction, to improve image quality and overall display efficiency, comprising the steps of:
   a) forming each of a plurality of picture element groups from the plurality of color picture elements, each color picture element being associated with a kparticular color corresponding to red, green, or blue;
   b) configuring the plurality of color picture elements, for each of the plurality of picture element groups, in a delta configuration;
   c) arranging each of the picture element groups, on the color liquid crystal display device, in the first direction parallel to the scanning electrodes, the color picture elements being disposed in a plurality of lines along the first direction such that color picture elements of the same color in any two adjacent lines are arranged at a 1.5 element pitch in the first direction and color picture elements of the same color in any two alternating lines are arranged in parallel along the second direction;
   d) connecting each of the plurality of parallel signal electrodes to only color picture elements of the same color on alternating sides of each signal electroded in alternating ones of the plurality of lines, respectively, so as to drive only color picture elements of the same color through each signal electrode;
   e) connecting each of the plurality of scanning electrodes to at least two color picture elements of a picture element group parallel thereto.

7. The method of claim 6, wherein thke plurality of parallel signal electrodes and the plurality of parallel scanning electrodes are connected to the color picture elements through switching elements.

8. The method of claim 6, wherein the plurality of parallel signal electrodes and the plurality of parallel scanning electrodes are connected to the color picture elements through non-linear elements.

9. The method of claim 6, wherein step d) of connecting further comprises:
   arranging each of the plurality of parallel signal electrodes on the liquid crystal device in the second direction and undulating by a 0.5 element pitch in the first direction, each of the plurality of parallel signal electrodes so as to connect each to only picture elements of the same color on alternating sides of each signal electrode in each line thereof.

10. A color liquid crystal display apparatus, comprising:
   a plurality of picture element groups arranged in a matrix, each picture element group including,
      a plurality of color picture elements, each color picture element associated with a particular color corresponding to red, green, or blue,
   said plurality of color picture elements being arranged in a delta configuration;
   a plurality of scanning electrodes arranged in parallel and extending over said matrix in a first direction; and
   a plurality of signal electrodes arranged in parallel and extending over said matrix in a second direction perpendicular to said first direction;
   said picture element groups being arranged parallel to said scanning electrodes and in such a manner that said color picture elements are disposed in a kplurality of lines along said first direction, color picture elements of the same color in any two adjacent lines being arranged at a 1.5 element pitch in said first direction, color picture elements of the same color in any two alternate lines beign arranged in parallel along said second direction,
   each said signal electrode being of a straight line configuration and being connected only to color picture elements of the same color at every two color picture element widths in said second direction, so as to drive only color picture elements of the same color through each signal electrode, and being connected in an arrangement such that color picture elements of picture element groups to be connected at adjacent signal electrodes are different in color, and
   said scanning electrodes being connected to at least two color picture elements of picture element groups parallel thereto.

11. The color liquid crystal display apparatus of claim 10 wherein said signal electrodes are connected to said color picture elements through non-linear elements.

12. The color liquid crystal display apparatus claimed in claim 11, wherein each said color picture element is divided in two parts, one part disposed on each alternate side of each signal electrode.

13. The color liquid crystal display apparatus of claim 11, wherein the non-linear elements are ones selected from the group consisting of TFT, MOS-FET, MIN, and back-to-back diode.

* * * * *